(12) United States Patent
Leger et al.

(10) Patent No.: US 11,520,892 B2
(45) Date of Patent: Dec. 6, 2022

(54) INTEGRATED CIRCUIT AND EMBEDDED SYSTEM INCLUDING SUCH AN INTEGRATED CIRCUIT WITH BOOTSTRAP CONFIGURATION FOR ATTACK PREVENTION

(71) Applicant: Robert Bosch GmbH, Stuttgart (DE)

(72) Inventors: Sebastien Leger, Stuttgart (DE); Benjamin Hettwer, Stuttgart (DE); Juergen Schramm, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 397 days.

(21) Appl. No.: 16/774,271

(22) Filed: Jan. 28, 2020

(65) Prior Publication Data
US 2020/0242248 A1 Jul. 30, 2020

(30) Foreign Application Priority Data
Jan. 29, 2019 (DE) .......................... 102019201096.2

(51) Int. Cl.
| | | |
|---|---|---|
| *G06F 21/57* | (2013.01) | |
| *G06F 21/75* | (2013.01) | |
| *G06F 21/76* | (2013.01) | |
| *H01L 23/00* | (2006.01) | |
| *G11C 17/18* | (2006.01) | |
| *G11C 17/16* | (2006.01) | |

(52) U.S. Cl.
CPC .......... *G06F 21/575* (2013.01); *G06F 21/75* (2013.01); *G06F 21/76* (2013.01); *G11C 17/16* (2013.01); *G11C 17/18* (2013.01); *H01L 23/576* (2013.01); *G06F 2221/034* (2013.01)

(58) Field of Classification Search
CPC ........ G06F 21/575; G06F 21/75; G06F 21/76; G06F 2221/034; G06F 21/14; G06F 21/57; H01L 23/576; H01L 23/00; G11C 17/18; G11C 17/16
See application file for complete search history.

(56) References Cited

U.S. PATENT DOCUMENTS

| | | | |
|---|---|---|---|
| 4,703,429 A * | 10/1987 | Sakata ............... | B60K 31/0008 180/170 |
| 4,962,294 A | 10/1990 | Beckham et al. | |
| 5,109,273 A * | 4/1992 | Parulski ................ | H04N 1/486 358/524 |
| 8,225,153 B2 * | 7/2012 | Redondo ................ | G06F 30/34 714/725 |
| 10,615,989 B2 * | 4/2020 | Kreft ....................... | G09C 1/00 |
| 2006/0136858 A1 | 6/2006 | Erickson et al. | |
| 2014/0280344 A1 * | 9/2014 | Draghicescu ..... | G06F 16/90344 707/780 |

(Continued)

OTHER PUBLICATIONS

J. Breier, et al., "An Electromagnetic Fault Injection Sensor Using Hogge Phase-Detector", in 18th International Symposium on Quality Electronic Design (ISQED), pp. 307-312, Mar. 2017.

*Primary Examiner* — Quazi Farooqui
(74) *Attorney, Agent, or Firm* — Norton Rose Fulbright US LLP; Gerard Messina

(57) ABSTRACT

An integrated circuit including an electronic fuse for supporting a secure bootstrap process, in which the fuse is queried. The circuit includes a protection against electromagnetic fault injection. The circuit is configured in such a way that the protection extends to the bootstrap process.

10 Claims, 1 Drawing Sheet

(56) References Cited

U.S. PATENT DOCUMENTS

2014/0371512 A1* 12/2014 Dalia ................... A61N 5/1048
600/1
2016/0328488 A1* 11/2016 Lytle ..................... G06F 16/252

* cited by examiner

INTEGRATED CIRCUIT AND EMBEDDED SYSTEM INCLUDING SUCH AN INTEGRATED CIRCUIT WITH BOOTSTRAP CONFIGURATION FOR ATTACK PREVENTION

CROSS REFERENCE

The present application claims the benefit under 35 U.S.C. § 119 of German Patent Application No. DE 102019201096.2 filed on Jan. 29, 2019, which is expressly incorporated herein by reference in its entirety.

FIELD

The present invention relates to an integrated circuit. The present invention additionally relates to an embedded system including such a circuit.

BACKGROUND INFORMATION

In the context of data processing, the term "eFuse," "E-Fuse," or "Fuse" for short, designates an electronic fuse, developed in its original form by IBM, which allows for dynamic real-time programming of computer chips. U.S. Pat. No. 4,962,294A describes an implementation of this approach as a one-time programmable, non-volatile memory element.

United States Patent Application Publication No. US 2006/0136858 A1 describes a method for in situ changing of system parameters of an integrated circuit. The integrated circuit includes E-Fuses designed as semiconductor elements, which, during the chip manufacture, are depictable on the silicon with metal connections in the chip, the operating type or accessibility of the circuit being coded on the basis of the information stored in the E-Fuses. The E-Fuses are selectively destroyed via coding using an integrated interface or an integrated E-Fuse control module.

Within the scope of the subsequent explanations, the term "electronic fuse" is always to be interpreted in a broad sense, which explicitly includes any non-volatile memory like flash or PCM.

SUMMARY

The present invention provides an integrated circuit, in particular an FPGA or microcontroller, and an embedded system, for example a system-on-a-chip (SoC) including such a circuit.

An example approach according to the present invention is based on the finding that the protection of an IT system from manipulation or reverse engineering is very important for its firmware. In the case of embedded systems, an attacker may achieve access to integrated circuits within the respective system, thus the security within these systems must be ensured. Checking the authenticity of the firmware before execution, firmware encryption, or protection of the debugger interface represent examples of security measures which are implemented in the integrated circuits in a secure bootstrap (secure boot).

These security mechanisms must be protected against physical attacks, like laser attacks, injection attacks by electromagnetic faults (electromagnetical fault injection, EM-FI), and side-channel attacks.

The insight further underlying the provided approach is that security information, as it relates, for example, to the activation of the secure system start-up, must be stored in a non-volatile memory. The already mentioned electronic fuses are generally used for this purpose. These may typically be set (to 1), however, not reset (to 0). Security relevant information, relating to the protection of the bootstrap, deactivation of the debugger interface, or the root key for the firmware encryption, is often stored in these types of fuses. Reading out the fuses is, however, sometimes complicated and slow, so that the fuses are loaded at the beginning of the start-up process in a volatile memory—for example, a process register—used as a hardware cache. Since fuses contain information important for the start-up process itself, they are loaded at the beginning of the process using a finite state machine implemented as hardware (FIG. 1). At this point in time, no software is executed. It should be noted that flash memory or battery-buffered random access memory (BRAM) may also be used for storing this security information.

An example circuit according to the present invention further contributes to already available countermeasures against fault injection, in particular electromagnetic fault injection. These include spatially or chronologically redundant implementation of critical operations, for example, by way of triple modular redundancy (TMR) or randomly variable run time behavior (jitter) of critical operations, in such a way that an attacker may not establish the correct point in time for the fault attack.

The implementation of a magnetic field detector is additionally appropriate: the magnetic field used for an attack is relatively strong and may be detected with high reliability. If an attack is detected, a correspondingly configured device switches into a secure lock mode. Such a detector is described by way of example in the following publication: J. Breier, S. Bhasin, and W. He. An electromagnetic fault injection sensor using hogge phase-detector. In 18$^{th}$ *International Symposium on Quality Electronic Design (ISQED)*, pages 307-312, March 2017.

In accordance with the present invention, it is recognized that these measures are implemented in many integrated circuits; however, they are not generally detected in the buffers (technical term: caches) of the fuses. This weak point permits an attacker to overcome the relevant measure.

One advantage of the example approach according to the present invention thus lies in the improved defense against EM-FI attacks.

Advantageous refinements and improvements of the present invention are possible due to the measures described herein. A specific embodiment of the present invention is thus provided, configured in such a way that the querying of the electronic fuse has a jitter. This variant is able to additionally make a potential attack more difficult.

BRIEF DESCRIPTION OF THE DRAWINGS

Exemplary embodiments of the present invention are depicted in the figures and are explained in greater detail below.

DETAILED DESCRIPTION OF EXAMPLE EMBODIMENTS

Figure 1:
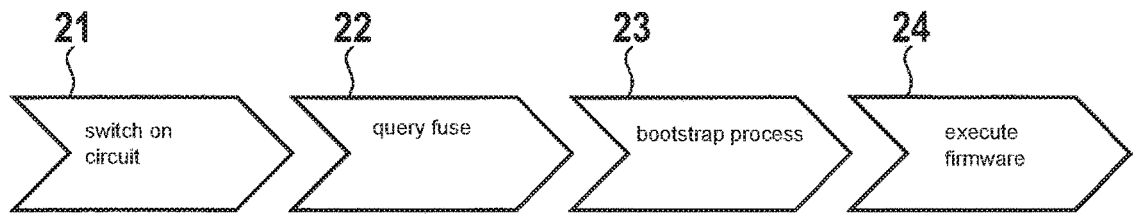
FIG. 1 shows the bootstrap process of a device.
Figure 2:
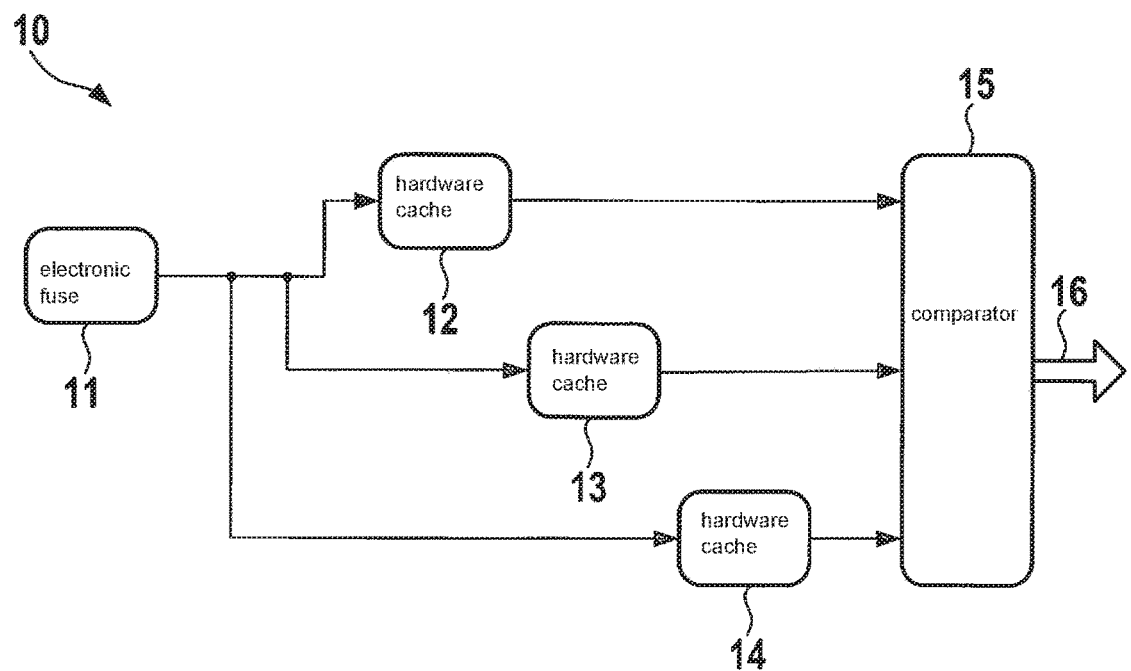
FIG. 2 shows by way of example a redundant implementation of the read process of a fuse.

According to the present invention, a magnetic field or EM-FI detector may be implemented in an integrated circuit and activated prior to caching of the fuse (reference numeral 22, FIG. 1). A redundant implementation of this fuse cache process (22) is likewise possible, as FIG. 2 illustrates. Since magnetic field injection may result in a common cause failure (CCF)—for example, clock interferences come into consideration—a redundant implementation is recommended in terms of time and space.

Example embodiments of the present invention are further described in the following paragraphs.

Paragraph 1: An integrated circuit (10), characterized by the following features:
the circuit (10) includes an electronic fuse (11) for supporting a secure bootstrap process (23), in which the fuse (11) is queried (22),
the circuit (10) has a protection against electromagnetic fault injection, and
the circuit (10) is configured in such a way that the protection extends to the bootstrap process (23).

Paragraph 2: The integrated circuit (10) as recited in Paragraph 1, characterized by the following features:
the circuit (10) includes hardware caches (12, 13, 14), and
the circuit (10) is configured to store query results in the hardware caches (12, 13, 14) during the querying (22) of the fuse (11).

Paragraph 3: The integrated circuit (10) as recited in Paragraph 2, characterized by the following feature:
the hardware caches (12, 13, 14) are processor registers (12, 13, 14) or RAM caches.

Paragraph 4: The integrated circuit (10) as recited in Paragraph 2 or 3, characterized by the following feature:
the hardware caches (12, 13, 14) are redundantly designed, and
the circuit (10) is configured to read the query results repeatedly in succession into the hardware caches (12, 13, 14).

Paragraph 5: The integrated circuit (10) as recited in Paragraph 4, characterized by the following features:
the circuit (10) includes a comparator (15) for managing a comparison between the process registers (12, 13, 14), and
the circuit (10) is configured to signal an alarm (16) in case the comparison fails.

Paragraph 6: The integrated circuit (10) as recited in Paragraph 4 or 5, characterized by the following features:
the process registers (12, 13, 14) are designed as triply redundant, and
the process registers (12, 13, 14) are spatially offset from one another.

Paragraph 7: The integrated circuit (10) as recited in one of Paragraphs 1 through 6, characterized by the following features:
the circuit (10) includes a magnetic field detector or an electromagnetic fault injection detector, and
the circuit (10) is configured to activate the magnetic field detector prior to the bootstrap process (23).

Paragraph 8: The integrated circuit (10) as recited in one of Paragraphs 1 through 7, characterized by the following feature:
the circuit (10) is configured in such a way that, after switching on (21) the circuit (10), the fuse (11) is initially queried (22), then the boot-up process (23) is continued, and finally a firmware (24) is executed.

Paragraph 9: The integrated circuit (10) as recited in one of Paragraphs 1 through 8, characterized by the following feature:
the circuit (10) is configured in such a way that the querying (22) of the fuse (11) has a jitter.

Paragraph 10: An embedded system including a circuit (10) according to one of Paragraphs 1 through 9.

What is claimed is:

1. An integrated circuit, comprising:
an electronic fuse for supporting a secure bootstrap process, the integrated circuit being configured for the fuse to be queried for the bootstrap process;
wherein:
the circuit includes a protection against electromagnetic fault injection, the protection extending to the bootstrap process; and
at least one of the following three features (a)-(c):
(a) the circuit includes for the protection a magnetic field detector or an electromagnetic fault injection detector, which the circuit is configured to activate prior to the bootstrap process; and
(b) the circuit is configured to perform the query of the fuse initially after the circuit is switched on, with the bootstrap process subsequently continuing and a firmware being subsequently executed; and
(c) the integrated circuit further comprises a comparator, copies of a result of the query are redundantly stored in a plurality of registers or hardware caches, the protection is implemented by the comparator comparing the copies of the result to each other, and the circuit is configured to output an alarm signal when the comparison fails.

2. The integrated circuit as recited in claim 1, further comprising:
the hardware caches, wherein the circuit is configured to store the copies of the result of the query in the hardware caches during the querying of the fuse.

3. The integrated circuit as recited in claim 2, wherein the hardware caches are processor registers or RAM caches.

4. The integrated circuit as recited in claim 3, wherein the hardware caches are redundantly designed, and wherein the circuit is configured to read the result of the query repeatedly in succession to obtain the copies, which are written into the hardware caches.

5. The integrated circuit as recited in claim 4, wherein the circuit includes the comparator configured to compare the copies of the result stored in the plurality of registers or hardware caches to each other, and wherein the circuit is configured to output an alarm signal when the comparison fails.

6. The integrated circuit as recited in claim 4, wherein the registers or hardware caches are triply redundant and are spatially offset from one another.

7. The integrated circuit as recited in claim 1, wherein the circuit includes the magnetic field detector or the electromagnetic fault injection detector, which the circuit is configured to activate prior to the bootstrap process.

8. The integrated circuit as recited in claim 1, wherein the circuit is configured to perform the query of the fuse initially after the circuit is switched on, with the bootstrap process subsequently continuing and a firmware being subsequently executed.

9. The integrated circuit as recited in claim 1, wherein the circuit is configured in such a way that the querying of the fuse has a jitter.

10. An embedded system including a circuit, the circuit comprising:
an electronic fuse for supporting a secure bootstrap process, the integrated circuit being configured for the fuse to be queried for the bootstrap process;

wherein:
the circuit includes a protection against electromagnetic fault injection, the protection extending to the bootstrap process; and
at least one of the following three features (a)-(c):
  (a) the circuit includes for the protection a magnetic field detector or an electromagnetic fault injection detector, which the circuit is configured to activate prior to the bootstrap process; and
  (b) the circuit is configured to perform the query of the fuse initially after the circuit is switched on, with the bootstrap process subsequently continuing and a firmware being subsequently executed; and
  (c) the integrated circuit further comprises a comparator, copies of a result of the query are redundantly stored in a plurality of registers or hardware caches, the protection is implemented by the comparator comparing the copies of the result to each other, and the circuit is configured to output an alarm signal when the comparison fails.

* * * * *